Jan. 11, 1944.  H. U. McGILL ET AL  2,339,023
CONTROL FOR STEERING APPARATUS
Filed Jan. 14, 1942  4 Sheets-Sheet 1
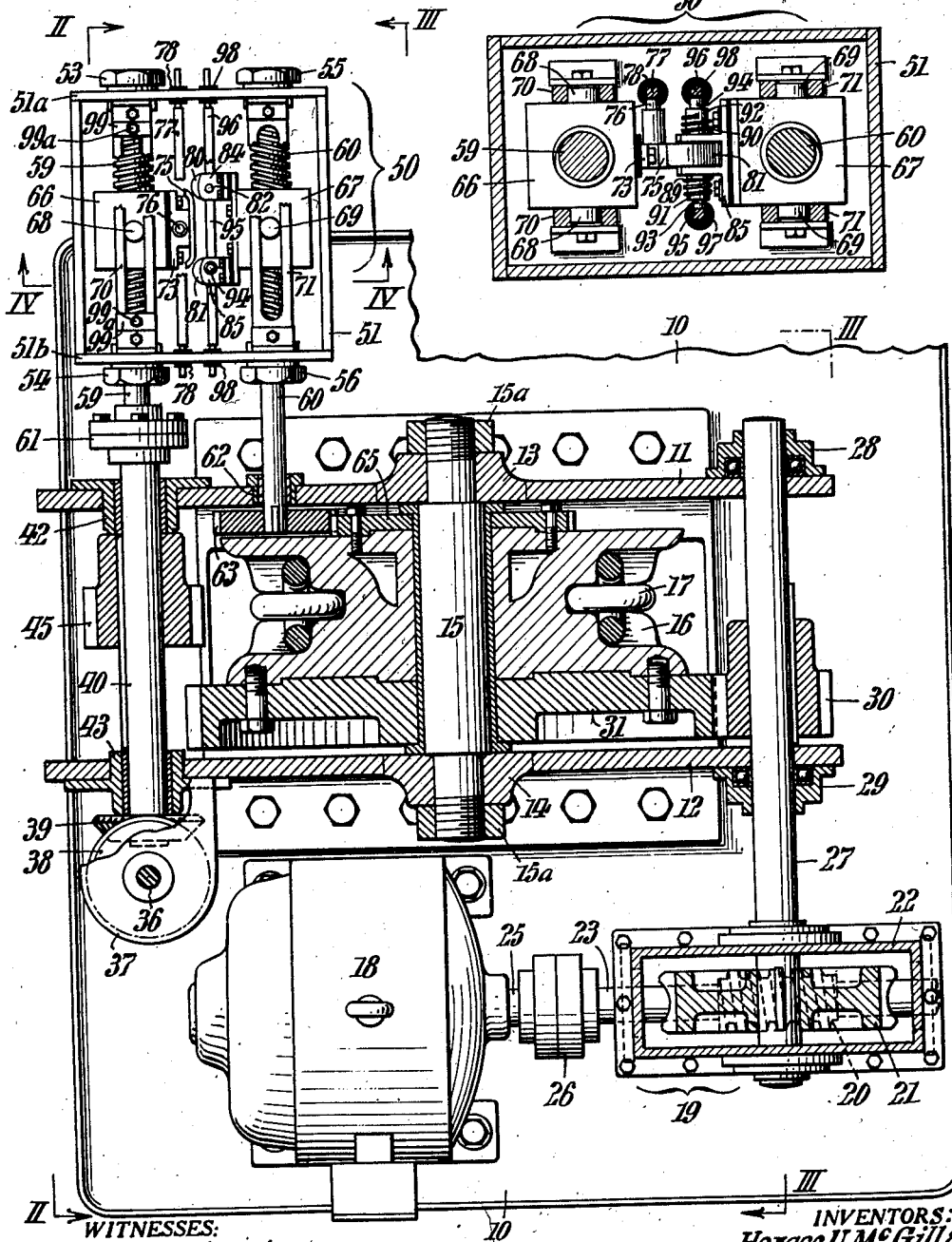
INVENTORS:
Horace U. McGill &
George C. Hilliard,
BY Paul Paul
ATTORNEYS.

Jan. 11, 1944. H. U. McGILL ET AL 2,339,023
CONTROL FOR STEERING APPARATUS
Filed Jan. 14, 1942 4 Sheets-Sheet 2
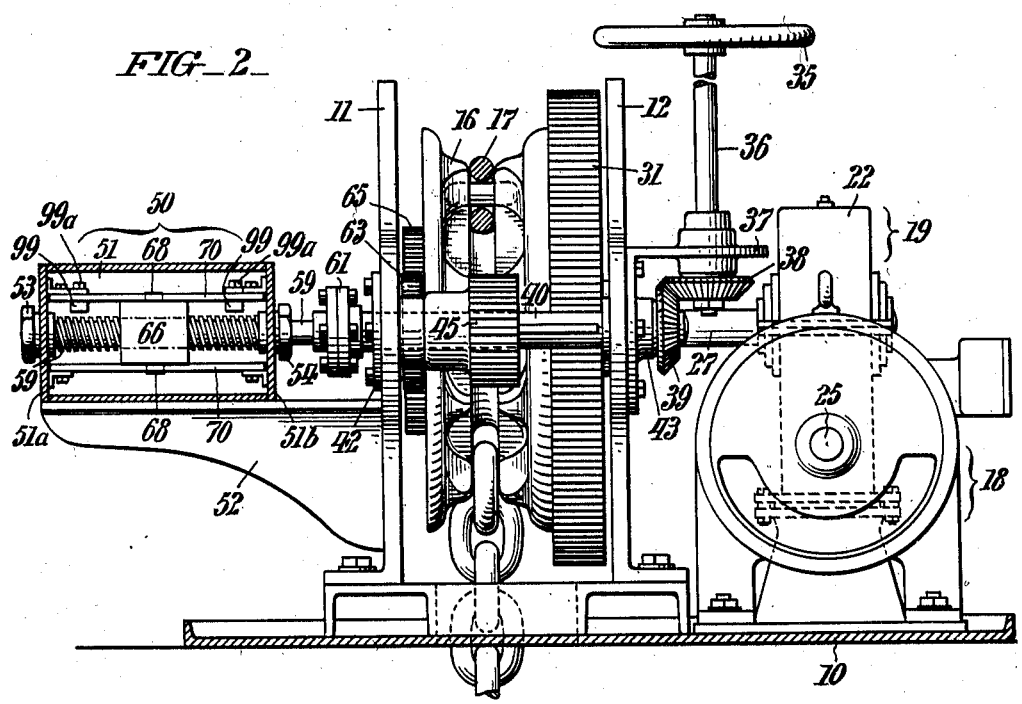
FIG_2_
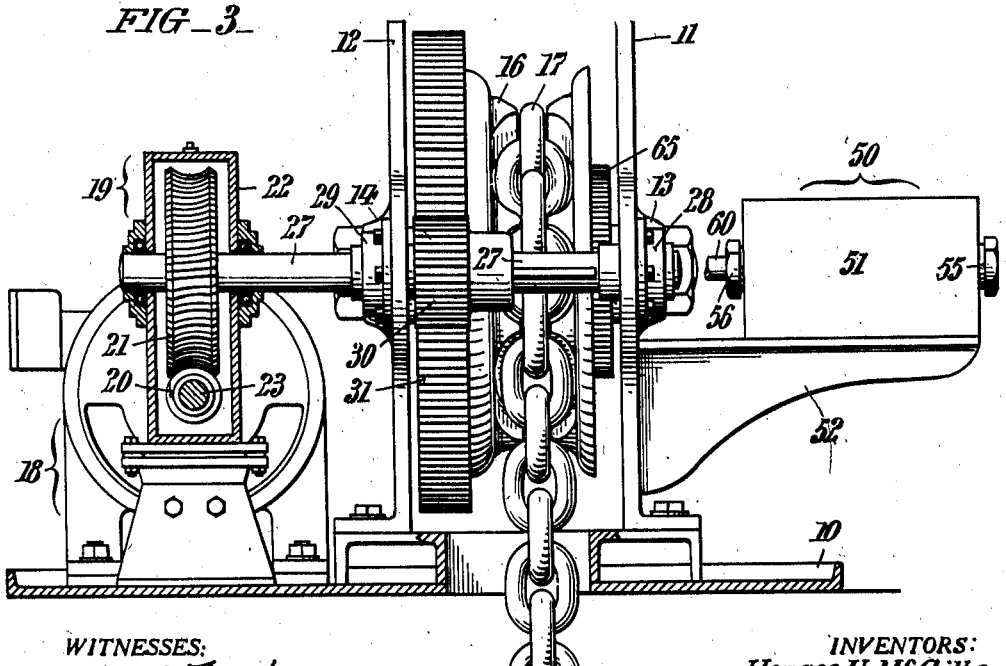
FIG_3_
WITNESSES:
INVENTORS:
Horace U. McGill &
George C. Hilliard,
BY
ATTORNEYS.

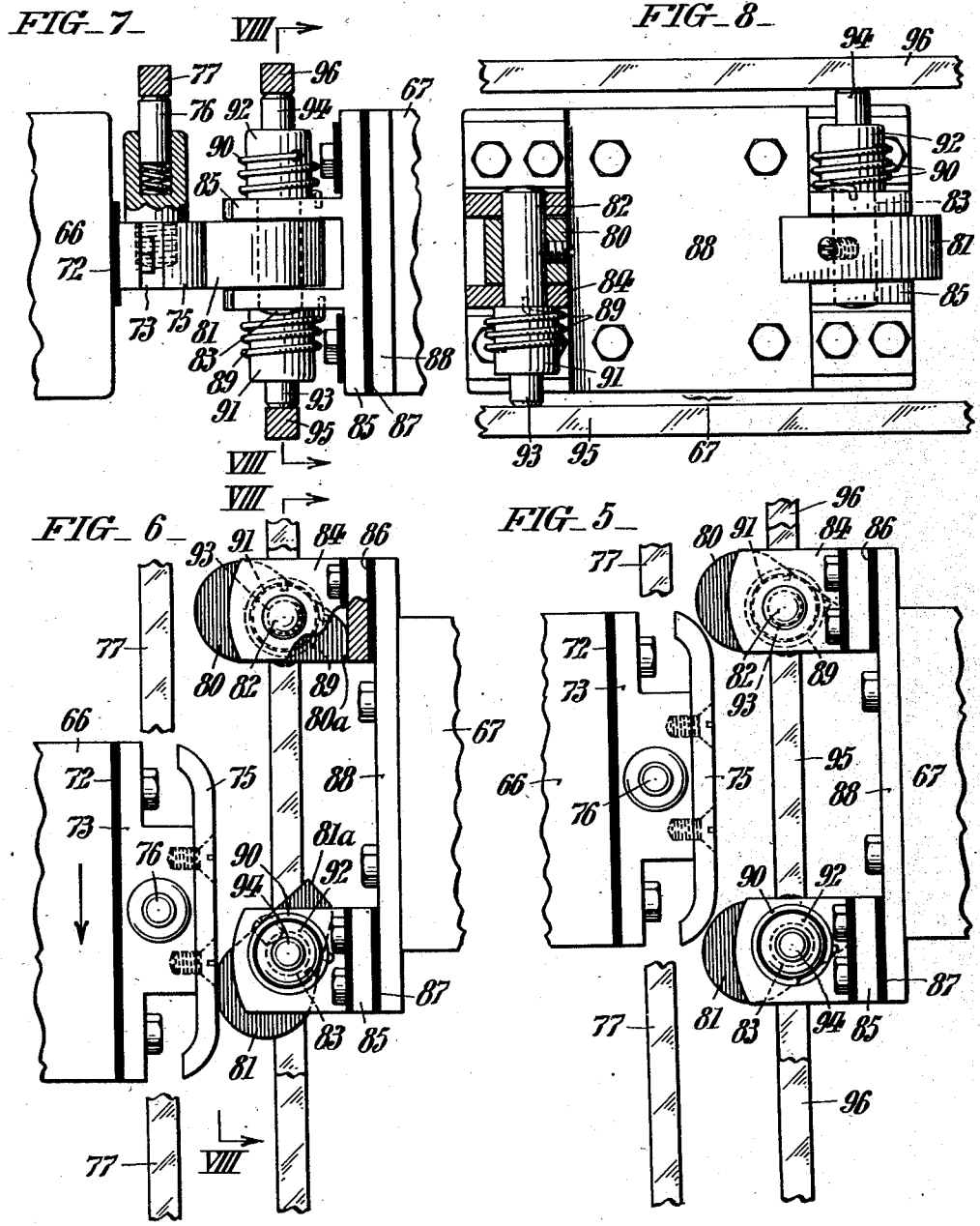

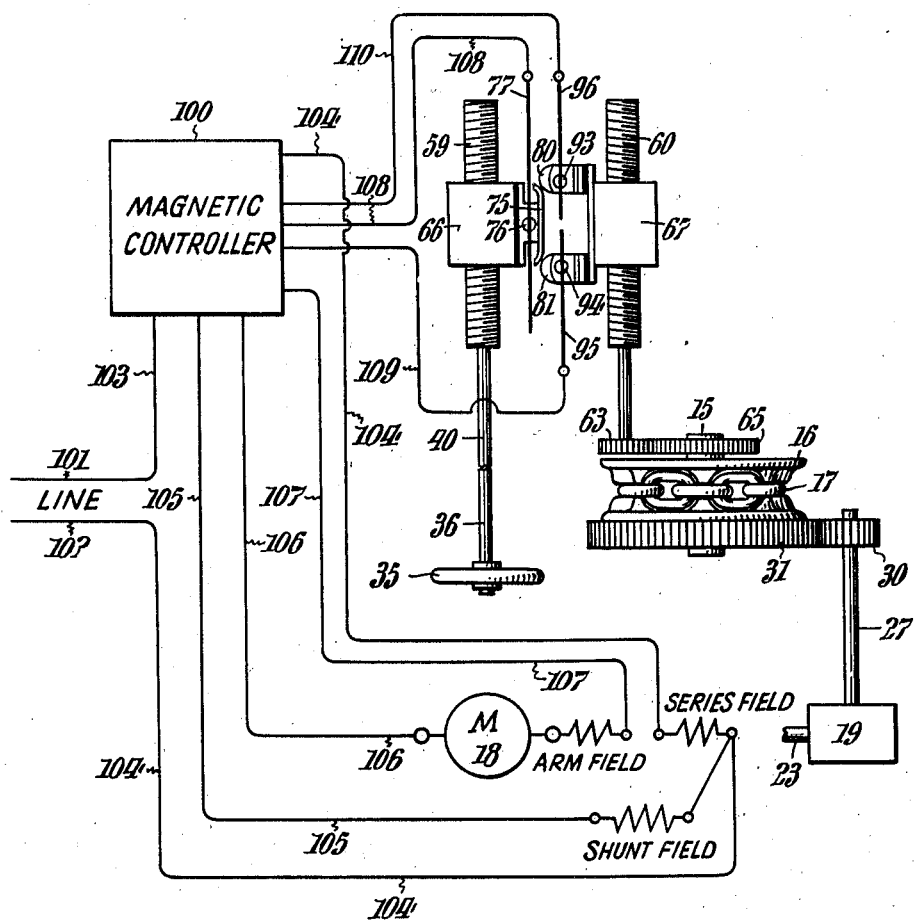

Patented Jan. 11, 1944

2,339,023

UNITED STATES PATENT OFFICE 2,339,023

CONTROL FOR STEERING APPARATUS

Horace U. McGill, Orange, and George C. Hilliard, Beaumont, Tex.

Application January 14, 1942, Serial No. 426,692

11 Claims. (Cl. 114—144)

This invention relates to controls for power driven apparatus and has reference more particularly to controls for electrically driven ship steering apparatus and the like.

The chief aim of our invention is to simplify controls of the kind referred to with a view toward rendering their operation more positive, toward insuring freedom from derangement in long continued service, toward making construction possible at low cost, and toward minimizing subsequent outlay for upkeep and repairs.

In connection with ship steering apparatus, it is further aimed to provide for the locking of the rudder actuating means against the possibility of the displacement of the rudder from any position to which it may be moved under governance of the control, and to enable the apparatus to be arranged, through provision of simple and easily adjusted means, for direct manual actuation in the event of failure of the control or of the power means.

Other objects and attendant advantages will appear from the following detailed description of the attached drawings, wherein Fig. 1 is a fragmentary view in horizontal section of an electrically driven ship steering mechanism embodying my improved control.

Fig. 2 is an elevation of the organization as it appears when viewed from the left of Fig. 1, with the housing for the control in vertical section taken as indicated by the angled arrows II—II in Fig. 1.

Fig. 3 is a view partly in elevation and partly in section taken as indicated by the angled arrows III—III in Fig. 1.

Fig. 4 is a cross section through the housing of the control taken as indicated by the angled arrows IV—IV in Fig. 1.

Fig. 5 is a fragmentary view corresponding to Fig. 1, drawn to a larger scale and showing, to better advantage, the details of an electrical contact element incorporated in the control.

Fig. 6 is a view like Fig. 5 with certain of the contact elements differently positioned.

Fig. 7 is a fragmentary detail view, partly in elevation and partly in section and corresponding to Fig. 4.

Fig. 8 is a fragmentary detail view, partly in elevation and partly in section, taken as indicated by the angled arrows VIII—VIII in Figs. 6 and 7; and Fig. 9 is a wiring diagram of the organization.

The steering apparatus illustrated in Figs. 1–3 is generally speaking of well known construction, having a base or bed 10 whereto are bolted a pair of spaced upstanding frames 11 and 12. These frames 11 and 12 have axially aligned central bosses 13 and 14 which are apertured for passage through them of the reduced threaded ends of an axle shaft 15 whereof the shouldered medial portion serves as a spacer for said frames. By means of the clamp nuts shown at 15a in Fig. 1, the frames 11 and 12 are drawn up tight against the shoulders of the axle shaft 15 and the latter secured against rotation. Mounted to revolve about the axle shaft 15 is an axially bushed sprocket drum 16 for a chain 17 whereby the ship rudder (not shown) is actuated in a well known manner. Also supported by the base or bed 10 is a reversible prime mover in the form of a compound-wound electric motor 18, and a speed reduction unit 19 of the worm gear type whereof the worm 20 and the wheel 21 run in oil within a sealed housing 22. As shown in Fig. 1, the shaft 23 of the worm 20 is directly connected to the shaft 25 of the motor 18 by a coupling 26; while the shaft 27 to which the worm wheel 21 is secured extends beyond the housing 22 for additional journal support in other bearings 28 and 29 on the frames 11 and 12. Splined to the shaft 27 intermediate the frames 11 and 12 with capacity for being shifted endwise is a spur pinion 30 which meshes with a spur wheel 31 bolted to the chain drum and free on the axle shaft 15. Through the gearing just described, the sprocket drum 16 may be turned in one direction or the other to effect through the chain 17 corresponding swinging of the rudder, depending upon the direction in which the motor 18 rotates.

For the purpose of governing the operation of the steering apparatus, we have provided a steering wheel 35, which, see Fig. 2, is secured to a shaft 36, the latter being in the illustrated instance vertically arranged and journaled in a bracket 37 bolted to the frame 12. Affixed to the lower end of the shaft 36 is a miter gear 38 which meshes with a companion miter gear 39 on another crosswise extending shaft 40 journaled in bearings 42 and 43 on the frames 11 and 12. Slidably splined on the shaft 40 in the interval between the frames 11 and 12 is a spur gear pinion 45 which is normally positioned as shown in Fig. 1 out of mesh with the spur gear 31.

At 50 is comprehensively designated the control with which our invention is more especially concerned. As shown, this control is in the form of a self contained unit with a housing 51 supported by a bracket 52 (Figs. 2 and 3) which extends laterally from the frame 11. Respectively journalled in bearings 53, 54 and 55, 56 in opposite end walls 51a and 51b of the housing 51 are two spaced horizontal screw spindles 59 and 60 with oppositely pitched threads. As further shown, the spindles 59 and 60 extend to the exterior through the bearings 54 and 56, the spindle 59 being connected to the shaft 40 (Fig. 1) by a coupling 61 for operation by means of the hand wheel 35 through the shaft 36 and miter gears 38 and 39, and the spindle 60 extending through a clearance opening 62 in the frame 11 and having secured to its outer end a spur gear wheel 63 which meshes with a spur wheel 65 bolted to the side of the sprocket wheel 16 opposite to that occupied by the spur wheel 31. Mounted on the spindles 59 and 60 are nut blocks 66 and 67 which are held from turning through engagement of stud projections 68 and 69 on them with fixed upper and lower slotted track bars 70 and 71 within the housing 51 of the control unit. To the nut block 66 is secured, with interposition of insulation 72, a holder piece 73 which carries an elongated contact shoe 75 whereof the ends are rounded off as shown in Figs. 1 and 5, said holder piece also carrying a spring urged brush 76 which frictionally bears upwardly against a fixed conductor bar 77 whereof the ends extend through bushings of insulation 78 in the end walls of the housing 51. The shoe 75 is adapted to cooperate with a pair of spaced contacts 80 and 81 which are pivotally supported by pins 82 and 83, respectively, and confined within the slots of small cleviced brackets 84 and 85 secured, with interposition of insulation 86 and 87, to opposite ends of a plate 88, the latter being in turn secured to the nut block 67 on the screw spindle 60. The projecting outer edge portions of the contacts 80 and 81 are eccentrically rounded with respect to the pivots 82 and 83 for frictional camming action with the shoe 75 as shown in Fig. 6 incident to which rotation is resisted by torsion springs 89 and 90 respectively secured at one of their ends to collars 91 and 92 on the pivot pins 82 and 83, and having their other ends anchored in the brackets 84 and 85. Normally, under the influence of the springs 89 and 90, the pivoted contacts 80 and 81 are yieldingly held in the positions in which they are shown in Figs. 1 and 5 with their flat-edged inner ends 80a and 81a resting against the base webs of the brackets 84 and 85. Spring pressed plunger brushes 93 and 94 slidably confined in guide bosses 91 and 92 on the brackets 84 and 85 bear downward and upward respectively upon parallel conductor bars 95 and 96, whereof the ends, like those of the conductor bar 77 extend to the exterior through bushings 97 and 98 in the end walls of the casing 51. In practice the casing 51 is kept filled with a suitable liquid such as transformed oil to prevent arcs from forming as the contacts of the control separate during operation of the steering apparatus in a manner presently set forth. In order to limit the travel of the nut block 66 on the spindle 59 in opposite directions, end stops 99, see Figs. 1 and 2, are provided, these stops being adjustable along the guide bar 70 and secured in adjusted positions by means of the headed clamp bolts shown at 99a. If desired or required, similar stops may be provided for the nut block 67.

In Fig. 9 which illustrates a wiring diagram for the complete organization above described, certain parts of the steering apparatus and the controller are only conventionally represented for the purposes of simplification. In addition to the electrical elements already referred to, a magnetic controller diagrammatically indicated at 100 is employed, said controller being of a commercial type comprising suitable relay actuated switches (not illustrated) for reversing the flow of electric current to the motor 18. Leading to this magnetic controller 100 from power line conductors 101 and 102 are branch conductors 103 and 104 in the latter of which the series field of the motor 18 is interposed, shunt field of a magnetic motor brake device being connected in a branch conductor 105, while the armature of said motor is connected in a circuit 106 and 107. The magnetic brake device just referred to operates as a means to cause substantially instant stoppage of the motor 18 when the switch contacts are broken. The conductor bar 77 of the control unit receives current by way of a wire 108, while wires 109 and 110 respectively lead from the conductor bars 95 and 96 to the actuating relays (not shown) for the reversing switch in the magnetic controller 100. The bar 77 is thus common to two circuits 108—109 and 108, 110 which respectively contain the bars 95 and 96. As illustrated in Figs. 5 and 9, the shoe 75 is somewhat shorter than the distance between the contacts 80 and 81 so as to be normally out of engagement with the latter. The motor 18 and the apparatus as a whole is thus normally at rest.

Assuming the position of the parts to be as shown in Figs. 1, 5 and 9 when the rudder is set for straight-away travel, the operation of the illustrated organization is as follows:

By turning the hand wheel 35 in one direction, the screw spindle 59 is correspondingly rotated with the result that the nut block 66 is moved downward to a position, say as shown in Fig. 6, into engagement with the contact 81, with resultant closure of the circuit 108, 109 and supply of electric current to the motor 18 to rotate it in one direction. Immediately upon starting of the motor 18, the sprocket drum 16 is driven through the speed reduction 19 to correspondingly swing the rudder through the chain 17. This action continues until through rotation of the screw spindle 60 by the drive gearing 63, 65 and the drum 16, the nut block 67 is caused to follow up on the nut block 66 until it assumes a neutral position as shown in Fig. 5 with respect to said nut block 66 when current flow to the motor 18 is interrupted and movement of the rudder operating mechanism ceases. These conditions will persist with the rudder set at a fixed angle until the nut block 66 is again moved by turning the hand wheel 35. If moved in the same direction as before, the angle of the rudder will be correspondingly increased. If, however, the hand wheel 35 is turned in the opposite direction, the nut block 66 will be moved upwardly in Fig. 6 through the reversed rotation of the screw spindle 59 with attendant engagement of the shoe 75 with the contact 80, whereupon current flow will be established in the circuit 108, 110 through the bars 77, 96 to actuate the other relay switch in the controller 100, thereby causing rotation of the motor 18 in a direction opposite to which it rotated in the first instance, thereby causing the rudder to be swung back toward its normal straight-away position. If during the last described operation, the nut block 66 is shifted upwardly beyond the position in which it is shown in Figs. 1 and 9, the rudder will be correspondingly swung to cause turning of the ship in the opposite direction. Since worm gearing is employed in the speed reduction unit 19, it will be seen that the rudder will remain fixed against displacement in any position to which it may be shifted, depending upon the extent to which the hand wheel 35 is turned.

Through provision of the adjustable stop blocks 99, a limit is set for the travel of the nut block 66 in either direction. This adjustment also serves as a measure for the swing of the rudder so that under no circumstances can the latter be injured or strained through over-running of the driving motor 18.

In case that either the motor 18 or the controller, or both, should fail for any reason, the steering mechanism may be arranged for manual operation simply by disconnecting the coupling 61; sliding the spur pinion 30 on the shaft 27 out of engagement with the gear wheel 31 secured to the sprocket drum 16; and sliding the pinion 45 on the shaft 40 into mesh with said gear. With these changes, it will be evident that the sprocket wheel 16 can be directly rotated by manual effort applied to the steering wheel 35. With the spur wheel 31 and the pinion 45 proportioned as shown, two complete turns of the steering wheel 35 will suffice to operate the power gear from hand-over to hand-over.

From the foregoing it will thus be seen that by virtue of its simple and novel construction my improved control can be very economically manufactured and that it can be relied upon to give reliable service over long periods without requiring attention or servicing of any kind, this being particularly true since it is not called upon during either normal or manual operation of the rudder to transmit any of the propeller actuating effort, and moreover since the moving parts of the control are immersed in an oil.

Having thus described our invention, we claim:

1. The combination with ship steering apparatus having rudder actuating means operated from a reversible electric motor, of a control comprising a pair of spaced parallel screw spindles; nut blocks respectively mounted on the spindles; a contact shoe carried by one of the blocks; a pair of contacts carried by the other block, said contacts being spaced by a distance somewhat greater than the length of the shoe, which latter is normally positioned between the contacts out of engagement with them and which is common to two reversing electric circuits for governing opposite rotation of the motor respectively containing the contacts; manually operable means whereby one of the spindles may be rotated to different extents in one direction or the other to correspondingly shift the associated nut block thereby to effect engagement between the shoe and one or the other of the contacts to close one or the other of the circuits to determine rotation of the motor in one direction or the other for a definite time interval, with attendant movement of the rudder of the steering apparatus correspondingly; and means whereby the second screw spindle is rotated from the driven gearing of the steering apparatus to cause its nut block to catch up with the first nut block thereby to restore the shoe and the two contacts to their normal relative positions with both circuits open and with the rudder set in the desired position.

2. The combination according to claim 1, wherein the screw spindles, the nut blocks, shoe and the contacts are all enclosed in a casing filled with an arc-preventing liquid.

3. The combination according to claim 1, wherein the contacts are pivotally mounted individually and torsionally restrained against rotation and wherein said contacts have rounded edges eccentric to the pivots for frictional camming action with the shoe.

4. The combination according to claim 1, wherein the nut block which carries the shoe is mounted on the manually operable screw spindle.

5. The combination according to claim 1, wherein the nut blocks carry brushes which are in metallic engagement respectively with the shoe and the two individual contacts; and wherein three current carrying bars extending parallel to the screw spindles and connected in the two circuits are frictionally engaged by the respective brushes.

6. The combination according to claim 1, wherein the nut blocks carry brushes which are in metallic engagement respectively with the shoe and the two individual contacts; wherein three current carrying bars extending parallel to the screw spindles and connected in the two circuits are frictionally engaged by the respective brushes; and wherein the screw spindles, the nut blocks, shoe, contacts, brushes and current bars are all enclosed in a casing filled with an arc-preventing liquid.

7. The combination according to claim 1, including adjustable end stops for limiting the movement of one of the nut blocks along its spindle in opposite directions.

8. The combination according to claim 1, including adjustable end stops for limiting the movement of the nut block along the spindle of the manually-operable screw in opposite directions.

9. The combination according to claim 1, wherein the nut block which carries the shoe is mounted on the manually operable screw spindle.

10. The combination according to claim 1, in which a speed reduction drive of the worm gear type is interposed between the motor and the rudder actuating means.

11. The combination according to claim 1, in which the steering apparatus comprises a sprocket drum with a chain for connection to the rudder; a spur wheel secured to the drum and adapted to be ordinarily driven by a spur pinion which is shiftably mounted on a shaft coordinated with the motor; and wherein the manually operable means includes a shaft connected to one of the spindles and on which another spur pinion is shiftably mounted but normally out of mesh with the spur gear aforesaid, whereby in the event of failure of the control or the motor, the steering mechanism may be arranged for manual operation by shifting the first mentioned spur pinion out of engagement with the spur gear and by shifting the second mentioned pinion into engagement with said gear.

HORACE U. McGILL.
GEORGE C. HILLIARD.